United States Patent
Wright et al.

(10) Patent No.: US 9,139,261 B2
(45) Date of Patent: Sep. 22, 2015

(54) PAYLOAD HANDLING APPARATUS AND SYSTEM

(75) Inventors: David Scott Wright, Ashby-de-la-Zouch (GB); Matthew Evans, Wigston (GB)

(73) Assignee: BABCOCK INTEGRATED TECHNOLOGY LIMITED, Bristol (GB)

( * ) Notice: Subject to any disclaimer, the term of this patent is extended or adjusted under 35 U.S.C. 154(b) by 981 days.

(21) Appl. No.: 13/318,831

(22) PCT Filed: May 7, 2010

(86) PCT No.: PCT/GB2010/000920
§ 371 (c)(1),
(2), (4) Date: Feb. 29, 2012

(87) PCT Pub. No.: WO2010/128306
PCT Pub. Date: Nov. 11, 2010

(65) Prior Publication Data
US 2012/0145031 A1 Jun. 14, 2012

(30) Foreign Application Priority Data
May 8, 2009 (GB) .................................. 0907972.4

(51) Int. Cl.
*B66F 13/00* (2006.01)
*B63B 25/22* (2006.01)
(Continued)

(52) U.S. Cl.
CPC ............... *B63B 25/22* (2013.01); *B65G 25/04* (2013.01); *B25B 27/08* (2013.01); *B25B 31/00* (2013.01)

(58) Field of Classification Search
USPC ............................................................ 254/1
See application file for complete search history.

(56) References Cited

U.S. PATENT DOCUMENTS 2,363,797 A * 11/1944 Lovfald .......................... 114/72
3,437,066 A * 4/1969 Schwendtner ................ 114/260
(Continued)

FOREIGN PATENT DOCUMENTS

| GB | 249 262 | 3/1926 |
|---|---|---|
| JP | 2004 009942 | 1/2004 |

OTHER PUBLICATIONS

International Search Report for PCT/GB2010/000920.
(Continued)

*Primary Examiner* — Lee D Wilson
*Assistant Examiner* — Alvin Grant
(74) *Attorney, Agent, or Firm* — Nicholas B. Trenkle; Stites & Harbison, PLLC

(57) ABSTRACT

The present invention has been developed to improve the way a payload support platform, such as a mole, is driven between one site and another, particularly when the second site is the interior of a Lift which interfaces with a Pallet Handling System (PHS) of a ship. In a first aspect the invention proposes that the driving means which drives the payload support platform along a rail (10) is also used to move that rail (10) relative to the payload support platform and a support rail (22) so that the position of the rail can be changed during the movement of the payload support platform between one site and another. The payload support platform is lockable to the support rail (22), such that the force which drives the payload support platform along the rail (10) changes to driving the rail (10) relative to the support rail (22). In a second independent aspect of the invention the movable rail (10) is mounted in the gap between ends of fixed rails (62, 82) and is movable along a support rail (22) on which it is mounted between a position in which one end of the movable rail (10) is adjacent an end of one of the fixed rails (62, 82) to another position in which the other end of the movable rail (10) is adjacent the end of the other fixed rail (62,82).

12 Claims, 3 Drawing Sheets

(51) Int. Cl.
  *B65G 25/04* (2006.01)
  *B25B 31/00* (2006.01)
  *B25B 27/08* (2006.01)

(56) References Cited

U.S. PATENT DOCUMENTS 3,552,344 A * 1/1971 Wilson .......................... 114/260
3,687,309 A * 8/1972 Macrander ................. 414/137.7
3,756,446 A * 9/1973 Macrander ................. 414/137.7
1,519,241 A   1/1978 Nishino et al.
4,138,961 A * 2/1979 Roper ............................ 114/72
4,549,835 A * 10/1985 Ando et al. ...................... 405/4
6,019,314 A * 2/2000 Craig ........................... 244/115

OTHER PUBLICATIONS

Written Opinion of the International Searching Authority for PCT/GB2010/000920.

* cited by examiner

PAYLOAD HANDLING APPARATUS AND SYSTEM

BACKGROUND OF THE INVENTION

1. Field of the Invention

The present invention relates to payload handling apparatus and payload handling systems, in particular apparatus and systems in which a payload support platform is positively guided by a guide rail.

2. Summary of the Prior Art

On military ships handling equipment is used to move munitions between dedicated preparation areas on the upper decks and stowage areas on the lower decks. A known system includes a Pallet Handling System (PHS) and a Lift. The Pallet Handling System is the collective term commonly used to refer to the automated system that facilitates the stowage and movement of palletised munitions. The Lift interfaces with the PHS to facilitate the movement of pallets between decks. Munitions are stowed on pallets within the stowage area. The pallets are positively latched and mounted on shock mounts when stowed. Handling of the pallets within, into, and out of the stowage area is achieved by the use of motorised handling units commonly known as moles being a type of payload support platform. The moles are positively guided and are able to lift and transport nominated pallets as directed by an operator.

SUMMARY OF THE INVENTION

The present invention seeks to provide a means by which the moles may transfer payload between the PHS and Lift.

The present invention in its various aspects, has been developed to improve the way a payload support platform, such as a mole, is driven between one site and another, particularly when the second site is the interior of a Lift. In a first aspect of the present invention, at its most general, the present invention proposes that the driving means which drives the payload support platform along a rail is also used to move that rail relative to the payload support platform and a support rail so that the position of the rail can be changed during the movement of the payload support platform between one site and another. The payload support platform is lockable to the support rail, such that the force which drives the payload support platform along the rail changes to driving the rail relative to the support rail. This first aspect has both apparatus and method options.

With this arrangement, the structure is simplified since the same drive means both drives the payload support platform relative to the rail, and also moves the rail relative to the support rail when the rail needs to change position. This can then be used to move the rail from one position to another, which then enables the apparatus to bridge a gap between one fixed section of rail and another fixed section of rail. An example of such a gap is that between the end of a rail of a Pallet Handling System (PHS) on the lower deck of a ship and the corresponding end of a rail integrated into a Lift which permits travel between decks. As a result of the movement of the movable rail relative to the slider support rail, the movable rail may be moved from a position in which it interfaces the rail of the PHS to one in which it interfaces the rail of the Lift, or vice versa. Thus, a payload support platform such as a motorised handling unit, commonly referred to as a mole, can travel between the PHS and Lift. The payload support platform may carry payload such as weapons, i.e. palletised munitions.

In a first aspect, the present invention may provide a payload handling system including a payload support platform for supporting a payload, and payload handling apparatus, the payload handling apparatus having an elongate movable rail rigidly connected to a slider slidably mounted on an elongate slider support rail so that the movable rail is slidable relative to the slider support rail, the payload support platform having driving means engaged with the movable rail and actuatable to drive the payload support platform along the movable rail, and the payload handling system including locking means capable of locking the payload support platform in a position relative to the slider support rail whereby actuation of the driving means causes movement of the movable rail relative to the payload support platform.

(This also results as consequent movement of the slider along the slider support rail).

With this arrangement, the movable rail is movable by sliding relative to the slider support rail to e.g. enable the movable rail to interface between fixed rails whose ends are separated by a gap. The driving means of the payload support platform may be used to both move the payload support platform along the movable rail and to move the movable rail from one position to another, for example between the fixed rail interfaces. There is thus no need for a separate mechanism for moving the movable rail.

The movable rail may also function as a movable guide rail to guide the payload support platform along its length. The payload support platform may have guide means engaged with the movable rail to enable the payload support platform to be guided along the movable rail. In embodiments in which the movable rail interfaces with fixed guide rails, those fixed guide rails may also function as fixed guide rails along which the payload support platform may be guided.

The driving means of the payload support platform may be a pinion gear rotatable about an axis. The movable rail may include a corresponding rack gear which engages with the pinion gear, rotation of the pinion gear causing relative linear movement between the rack gear and the axis of the pinion gear.

Also, in the first aspect, there may be provided a method of moving a payload, comprising:

driving a payload support platform supporting the payload along a movable rail using drive means of the payload support platform, locking the payload support platform relative to a support rail, and driving the movable rail relative to the payload support platform and the support rail using the drive means.

As was mentioned previously, the first aspect of the invention may be used to enable the movable rail to bridge a gap between one fixed section of rail and another. Indeed, this represents a second, independent, aspect of the present invention. In the second aspect, at its most general the movable rail is mounted in the gap between ends of fixed rails and is movable along a support rail on which it is mounted between a position in which one end of the movable rail is adjacent an end of one of the fixed rails to another position in which the other end of the movable rail is adjacent the end of the other fixed rail.

In such an arrangement, a payload support platform can be moved from one of the fixed rails onto the movable rail, when the movable rail is adjacent that fixed rail, and then the movable rail moved until it is adjacent the other fixed rail, at which point the payload support platform may be moved onto the other fixed rail. It should be noted that, in this aspect, it is normal for the movement of the movable rail to be linear, so that it is of a significantly different length to the gap between the ends of the fixed rails.

Thus, in the second aspect, the present invention may provide payload handling apparatus for enabling movement of a payload support platform supporting a payload along a movement path, the apparatus having:

elongate first and second fixed rails extending along the movement path and having respective terminus ends separated by a gap, the first and second fixed rails each being arranged to engage one or both of guide means or drive means of a payload support platform to respectively guide and/or drive the payload support platform along that fixed rail; and an elongate movable rail extending along the movement path and rigidly connected to a slider slidably mounted on an elongate slider support rail so that the movable rail is slidable relative to the slider support rail, the movable rail being capable of engaging one or both of guide means or drive means of a payload support platform to respectively guide and/or drive the payload support platform along the movable rail, wherein the slider support rail is arranged relative to the movement path such that the movable rail is slidable between a retracted position in which one of its ends interconnects with the terminus (free) end of the first fixed rail and an extended position in which the other of its ends interconnects with the terminus (free) end of the second fixed rail.

In this way, a payload support platform can be moved along the movement path from the first fixed rail to the second fixed rail via the movable rail. The movement of a payload support platform along the rails may be guided by guide means of the payload support platform. The payload support platform may be moved by manual means or by use of an external drive mechanism. Alternatively, or in addition, drive means of the payload support platform may engage with the rails to drive the payload support platform along the rails. The slider support rail may be aligned with, e.g. parallel to, the movement path to achieve the movement of the movable rail between the retracted and extended positions.

Also, in the second aspect, there may be provided a method of moving a payload comprising:

moving a payload support platform supporting the payload along a first fixed rail and onto a movable rail, when an end of the movable rail is adjacent a free end of the first fixed rail, moving the movable rail along a support rail, to a position in which the other end of the movable rail is adjacent a free end of a second fixed rail, and moving the payload support platform from the movable rail onto the second fixed rail.

The payload support platform may move itself along the various rails by way of drive means which engage with the rails. Alternatively, or in addition, the payload support platform may be guided along each of the rails by way of guide means which engage with those rails.

In a third aspect, the first and second aspects are combined, so that the present invention may provide a payload handling system including payload handling apparatus according to the second aspect and a payload support platform for supporting a payload, the payload support platform having driving means engaged with the movable rail and actuatable to drive the payload support platform along the movable rail, and the payload handling system including locking means capable of locking the payload support platform in a position relative to the slider support rail whereby actuation of the driving means causes movement of the movable rail relative to the payload support platform.

A method of moving a payload using the payload handling system of the third aspect may include the steps of:

arranging the movable rail in the retracted position;

engaging a payload support platform supporting the payload with the first fixed rail;

actuating the driving means to drive the payload support platform along the first fixed rail and into engagement with the movable rail;

locking the locking means to lock the payload support platform in a position relative to the slider support rail;

actuating the driving means to move the movable rail relative to the payload support platform to the extended position;

unlocking the locking means; and actuating the driving means to drive the payload support platform along the movable rail and into engagement with the second fixed rail.

The method may include the additional steps of locking the movable rail in the retracted position, unlocking the movable rail before actuating the driving means to move the movable rail to the extended position, and locking the movable rail in the extended position. In this way, unwanted movement of the movable rail during movement of the payload support platform from the first fixed rail to the movable rail and from the movable rail to the second fixed rail is avoided.

In embodiments in which the driving means of the payload support platform is a pinion gear, the pinion gear may be rotated in one direction to drive the payload support platform along the movable rail and in the opposite direction to move the movable rail.

In a fourth aspect, the present invention may provide payload handling apparatus for guiding or driving movement of a payload support platform supporting a payload, the apparatus including:

an elongate movable rail arranged to engage corresponding guide means and/or drive means of a payload support platform to respectively guide and/or drive that payload support platform along the movable rail; and a slider slidably mounted on an elongate slider support rail aligned with, e.g. parallel to, the movable rail, the slider being rigidly connected to the movable rail such that the movable rail is slidable relative to the slider support rail.

With this arrangement, the movable rail is movable by sliding relative to the slider support rail. Thus, the movable rail may be moved longitudinally to e.g. bridge a gap between one fixed rail and another fixed rail as described above.

The following features of the invention are optional features of the first, second, third or fourth aspects.

The apparatus may include a clamp capable of clamping the slider in a position relative to the slider support rail. In this way, it is possible to lock the position of the movable rail relative to the slider support rail to prevent unwanted movement of the movable rail relative to the slider support rail, e.g. during movement of a payload support platform along the movable rail.

The slider support rail preferably comprises a linear bearing in order to facilitate the sliding of the slider along it. Alternatively, the slider may comprise one or more bearings at an interface with the slider support rail.

The movable rail may include a rack gear for engaging with a corresponding rotatable pinion gear on a payload support platform. Such engagement enables rotation of the pinion gear to cause relative movement between the rack gear and the rotational axis of the pinion gear. In this way, the payload support platform can be driven along the movable rail and/or the movable rail can be moved with respect to the payload support platform when the platform is locked in position. Alternatively, the movement of the payload support platform and/or movable rail can be achieved by other means such as a friction drive or a chain drive.

The apparatus may include a second slider support rail aligned with, e.g. parallel to, the slider support rail with the movable rail being arranged therebetween. A second slider may be connected to the movable rail and mounted on the second slider support rail so as to be slidable along it such that sliding of the second slider along the second slider support rail causes movement of the movable rail relative to the second slider support rail. Such an arrangement provides particularly good support for the movable rail. The apparatus may include a clamp capable of clamping the second slider in a position relative to the second slider support rail.

BRIEF DESCRIPTION OF THE DRAWINGS

By way of example, an embodiment of the present invention will now be described with reference to the following drawings.

DETAILED DESCRIPTION

Figure 1:
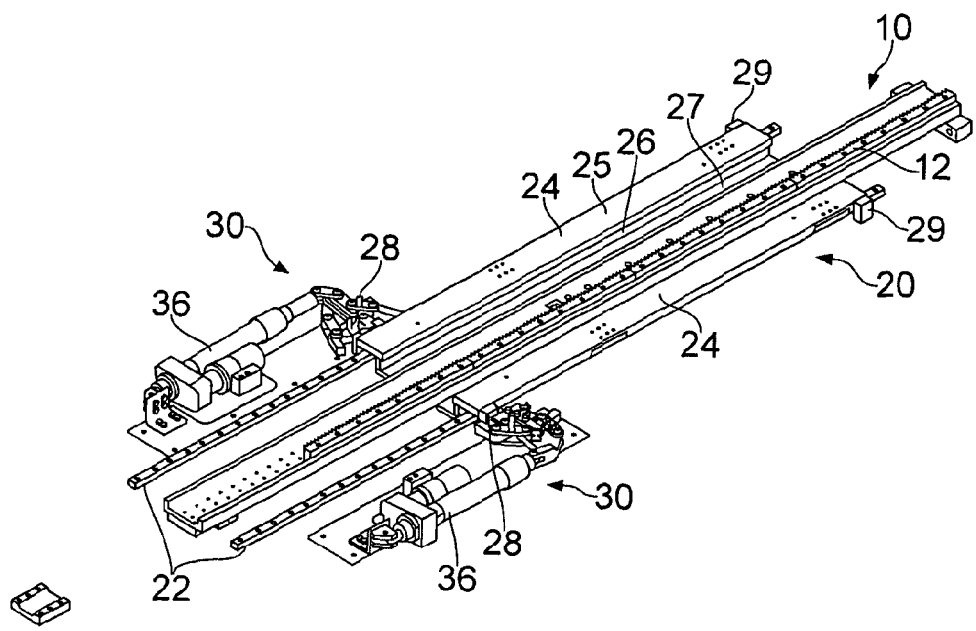
FIG. 1 shows an isometric view of payload handling apparatus according to an embodiment of the present invention.
Figure 2:
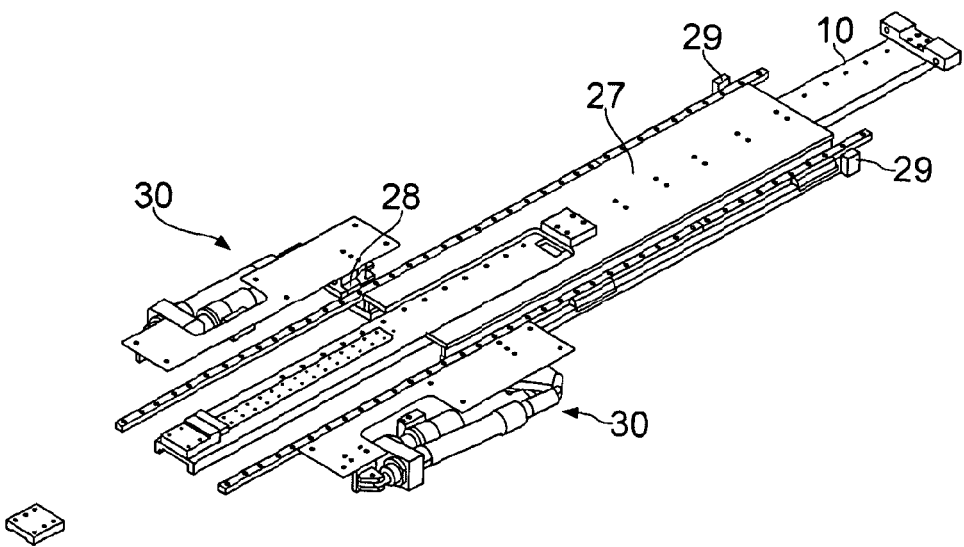
FIG. 2 shows an isometric view of the payload handling apparatus of FIG. 1 from underneath.
Figure 3:
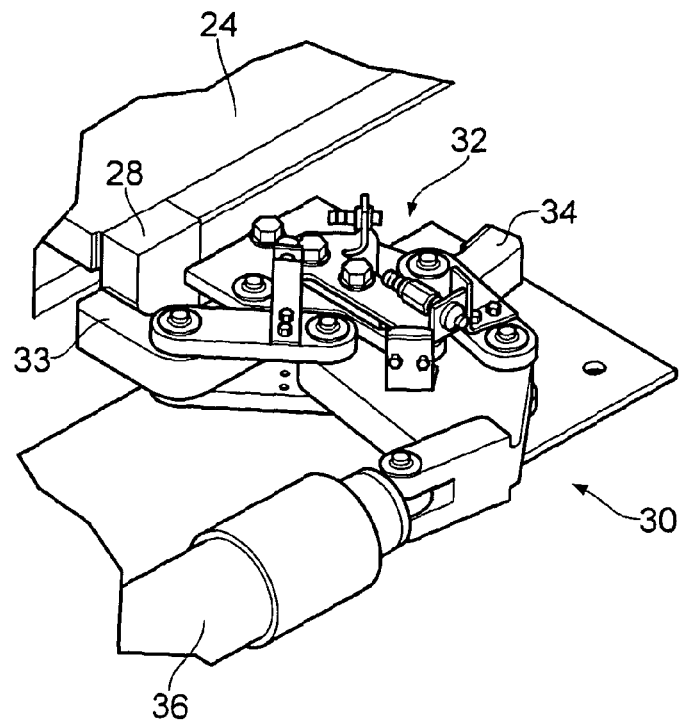
FIG. 3 shows a detail view of the clamping mechanism of the payload handling apparatus of FIG. 1.

The apparatus shown in FIGS. 1-6 comprises a movable guide rail 10, a slider assembly 20, and a pair of clamping mechanisms 30. The movable guide rail 10 includes a rack 12 which engages a rotatable pinion gear (not shown) of a mole (40; shown in FIG. 6) to drive the mole 40 along the movable guide rail 10, rotation of the pinion gear causing relative linear movement between the movable guide rail 10 and the mole 40.

The slider assembly 20 includes a pair of elongate slider support rails 22 and a pair of corresponding sliders 24, each mounted on a respective one of the slider support rails 22. The slider support rails 22 each comprise a linear bearing at the slider interface so that that the sliders 24 are able to slide freely. The sliders 24 each have an elongate portion which is 'L'-shaped in cross-section, with a first limb 25 which interfaces with the bearing surface of the slider support rails 22 and a second limb 26 which extends alongside the slider support rail 22. The sliders 24 are rigidly connected to one another by a support member 27 comprising a flat plate extending between the second limbs 26 of the sliders 24. The movable guide rail 10 is seated on the support member 27 so that it is flanked on either side by, and arranged parallel to, the second limbs 26 of the sliders 24. The movable guide rail 10 is fixed to the support member 27 to effect a rigid connection between the sliders 24 and the movable guide rail 10. In this way, when the sliders 24 slide along the slider support rails 22 the movable guide rail 10 is also moved by a corresponding amount in the same direction.

Each slider 24 also includes two stop members 28, 29, one at each end of the slider. The stop members 28, 29 project from the first limb 25 in generally the same direction as the second limb 26 so that a cross-section of each slider 24 taken through a stop member 28, 29 is generally 'U'-shaped. As can be seen from FIG. 3, each clamping mechanism 30 includes a claw 32 which can engage a respective one of the stop members 28, 29 to prevent movement of the sliders 24 relative to the slider support rails 22. Each claw 32 includes first and second hinged arms 33, 34 which are respectively pivoted into an engaging position by an actuator 36. In a clamping configuration the first hinged arm 33 of one claw 32 engages a face of a stop member 28, 29 facing in one direction along the slider rail 22, and the second hinged arm 34 of the other claw 32 engages a face of another stop member 28, 29 facing in the opposite direction. In this way, movement of the sliders 24 in either direction along the slider support rails 22 is prevented.

Figure 4:
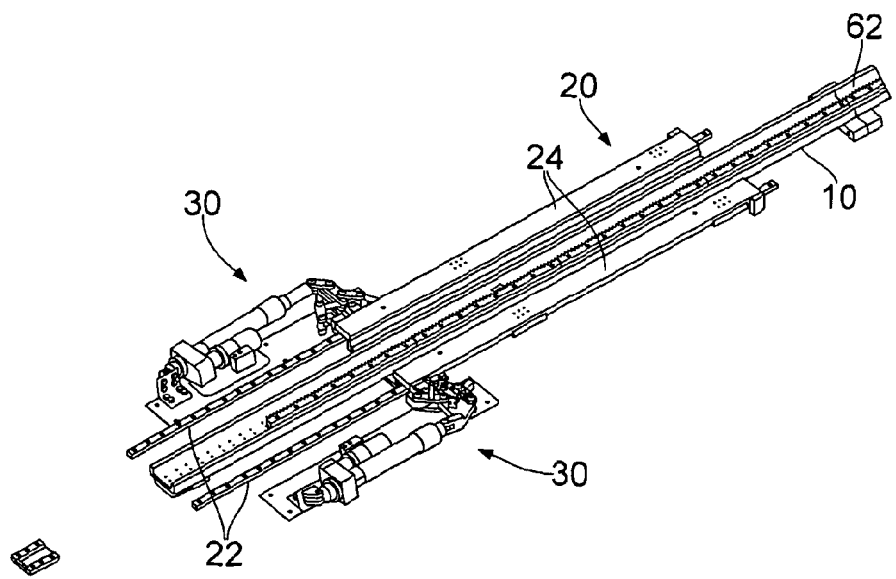
FIG. 4 shows an isometric view of the payload handling apparatus of FIG. 1 in a retracted position.
Figure 6:
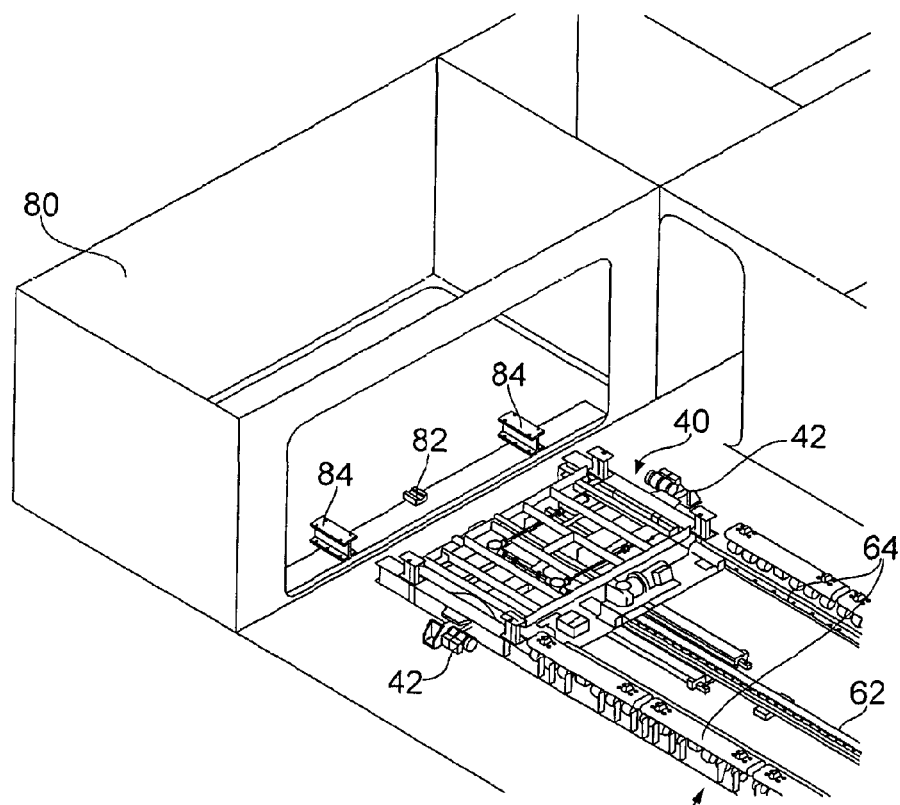
FIG. 6 shows an isometric view showing the payload handling apparatus of FIG. 1 installed onboard a ship.

When the claws 32 engage respective stop members 28 at the end of the sliders 24 nearest the Lift 80, as shown in FIGS. 4 and 6, the movable guide rail 10 is in a retracted position. In the retracted position the movable guide rail 10 interlocks with the fixed guide rail 62 of the Pallet Handling System (PHS) 60 so that the mole 40 can travel between the fixed guide rail 62 of the PHS and the movable guide rail 10.

Figure 5:
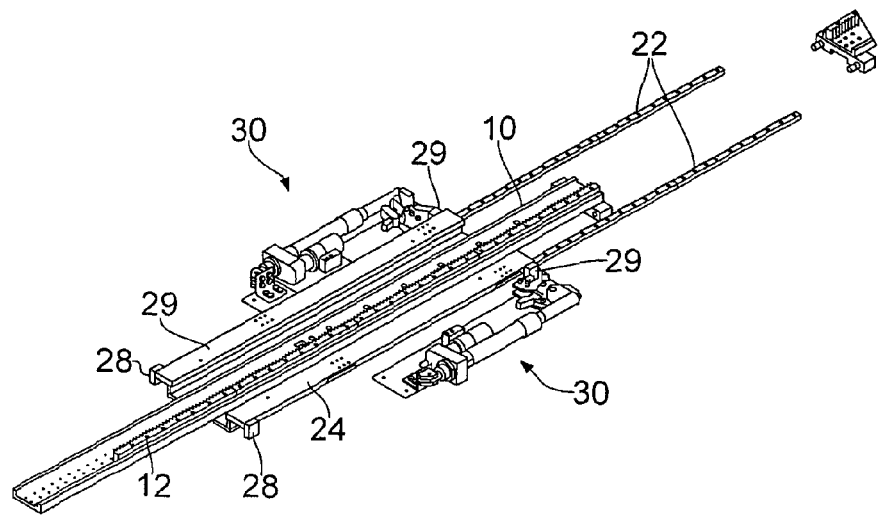
FIG. 5 shows an isometric view of the payload handling apparatus of FIG. 1 in an extended position.

Similarly, when the claws 32 engage respective stop members 29 at the other ends of the sliders 24, as shown in FIG. 5, the movable guide rail 10 is in an extended position. In the extended position the movable guide rail interlocks with the fixed rail 82 of the Lift 80 so that there is a gap between the movable guide rail 10 and the fixed guide rail 62 of the PHS 60. In this position the mole 40 can travel between the movable guide rail 10 and the fixed rail 82 of the lift 80.

The pinion gear of the mole 40 remains engaged with the rack 12 of the movable guide rail 10 in both the retracted and extended positions. This engagement provides positive control of payload supported by the mole 40 in the along-rail direction, since the rack and pinion drive cannot be back-driven. The mole 40 has pairs of guide rollers (not shown) which roll along the sides of the movable guide rail 10, fixed guide rail 62 of the PHS 60, and fixed rail 82 of the Lift 80. The guide rollers provide positive control of payload supported by the mole 40 in the across-rail direction. As well as being supported by the movable guide rail 10, the mole 40 is supported on pairs of parallel tracks 64, 84 of the PHS 60 and Lift 80, respectively. The tracks 64, 84 provide a load bearing track and containment (shock) for the mole 40. They also provide positive control of payload supported by the mole 40 in the vertical direction. In other embodiments the tracks 64, 84 could provide guidance for the mole 40.

The apparatus includes two locks 42, each mounted on one of the parallel tracks 64 of the PHS 60. The locks 42 are mechanical locks actuated by an electric motor driving a screw device. They can lock the mole 40 to the tracks 64 to prevent movement of the mole 40 along the tracks 64 and thus also movement of the mole 40 relative to the slider support rails 22. In other embodiments the apparatus may also include additional locks mounted on the parallel tracks 84 of the Lift 80 in order to be able to prevent movement of the mole 40 relative to those tracks 84.

A method of using the above-described apparatus to move a payload from the PHS 60 to the Lift 80 will now be described. The movable guide rail 10 is arranged in the retracted position shown in FIGS. 4 and 6, and is locked in position by engagement of the clamps 30 with the stop members 28. The pinion gear (not shown) of the mole 40 is rotated in a drive direction by a motor (not shown) to drive the mole 40 along the rack 12 so that it travels from the fixed guide rail 62 of the PHS 60 onto the movable guide rail 10 and into the position shown in FIG. 6.

The locks 42 are then engaged to lock the mole 40 to the tracks 64 of the PHS 60, and the clamps 30 are disengaged from the stop members 28 to enable free movement of the sliders 24 along the slider support rails 22. The pinion gear (not shown) of the mole 40 is then rotated in the opposite direction to the driving direction, so that the movable guide rail 10 is moved relative to the slider support rails 22 into the extended position shown in FIG. 5. During this movement step the sliders 24 each slide along their respective slider support rails 22.

The clamps 30 then engage the stop members 29, as shown in FIG. 5, to lock the movable guide rail 10 in the extended position. The pinion gear of the mole 40 is then rotated in the drive direction to drive the mole 40 along the rack 12 so that it travels from the movable guide rail 10 onto the fixed guide rail 82 of the Lift 80. Once in this position, the mole 40 can deposit the pallet it is carrying into the Lift 80.

The mole 40 then drives itself out of the Lift 80 onto the movable guide rail 10. It is locked to the tracks 84 of the Lift 80 by the locks 42, and its pinion gear is rotated in the opposite direction to the driving direction to move the movable guide rail 10 to the retracted position shown in FIG. 4. The mole 40 then drives itself along the movable guide rail 10 and onto the fixed guide rail 62 of the PHS 60.

The invention claimed is:

1. A payload handling system including a payload support platform for supporting a payload, and payload handling apparatus,
    the payload handling apparatus having an elongate movable rail rigidly connected to a slider slidably mounted on an elongate slider support rail so that the movable rail is slidable relative to the slider support rail,
    the payload support platform having driving means engaged with the movable rail and actuatable to drive the payload support platform along the movable rail, and
    the payload handling system including locking means capable of locking the payload support platform in a position relative to the slider support rail whereby actuation of the driving means causes movement of the movable rail relative to the payload support platform.

2. A payload handling system according to claim 1, wherein the payload support platform has guide means engaged with the movable rail to enable the payload support platform to be guided along the movable rail.

3. A payload handling system according to claim 1, wherein the driving means of the payload support platform comprises a pinion gear rotatable about an axis and the movable rail comprises a corresponding rack gear which engages with the pinion gear.

4. A payload handling system according to claim 1, wherein the payload handling apparatus includes a clamp arranged to clamp the slider in a position relative to the slider support rail.

5. A payload handling system according to claim 1, wherein the payload handling apparatus includes a second slider support rail aligned with the slider support rail, with the movable rail arranged therebetween, and a second slider connected to the movable rail and mounted on the second slider support rail so as to be slidable along the second slider support rail.

6. A method of moving a payload, comprising:
    driving a payload support platform supporting the payload along a movable rail using drive means of the payload support platform,
    locking the payload support platform relative to a support rail, and
    driving the movable rail relative to the payload support platform and the support rail using the drive means.

7. A payload handling system according to claim 1, further comprising elongate first and second fixed rails extending along a movement path of the payload support platform and having respective free ends separated by a gap, the first and second fixed rails each being arranged to engage one or both of guide means or the driving means of the payload support platform to respectively guide, drive, or guide and drive the payload support platform along that fixed rail, and
    wherein the slider support rail is arranged relative to the movement path such that the movable rail is slidable between a retracted position in which one of its ends interconnects with the free end of the first fixed rail and an extended position in which the other of its ends interconnects with the free end of the second fixed rail.

8. A payload handling system according to claim 7, wherein the payload handling apparatus includes a clamp arranged to clamp the slider in a position relative to the slider support rail.

9. A payload handling system according to claim 7, wherein the payload handling apparatus includes a second slider support rail aligned with the slider support rail, with the movable rail arranged therebetween, and a second slider connected to the movable rail and mounted on the second slider support rail so as to be slidable along the second slider support rail.

10. A method according to claim 6, further comprising:
    moving the payload support platform supporting the payload along a first fixed rail and onto the movable rail, when an end of the movable rail is adjacent to a free end of the first fixed rail,
    moving the movable rail along the support rail, to a position in which the other end of the movable rail is adjacent to a free end of a second fixed rail, and
    moving the payload support platform from the movable rail onto the second fixed rail.

11. A method of moving a payload using the payload handling system according to claim 7, the method including the steps of
    arranging the movable rail in the retracted position;
    engaging a payload support platform supporting the payload with the first fixed rail;
    actuating the driving means to drive the payload support platform along the first fixed rail and into engagement with the movable rail;
    locking the locking means to lock the payload support platform in a position relative to the slider support rail;
    actuating the driving means to move the movable rail relative to the payload support platform to the extended position;
    unlocking the locking means; and
    actuating the driving means to drive the payload support platform along the movable rail and into engagement with the second fixed rail.

12. A method of moving a payload according to claim 11, including the steps of:
    locking the movable rail in the retracted position;
    unlocking the movable rail before actuating the driving means to move the movable rail to the extended position; and
    locking the movable rail in the extended position.

* * * * *